United States Patent [19]
Weiser

[11] Patent Number: 5,920,404
[45] Date of Patent: Jul. 6, 1999

[54] METHOD AND SYSTEM FOR DYNAMIC CONTROL OF A MESSAGING ENVIRONMENT FROM A FACSIMILE PROCESSOR

[75] Inventor: Russel F. Weiser, Springville, Utah

[73] Assignee: Novell, Inc., Provo, Utah

[21] Appl. No.: 08/818,329

[22] Filed: Mar. 14, 1997

Related U.S. Application Data

[60] Provisional application No. 60/013,541, Mar. 15, 1996.

[51] Int. Cl.$^6$ ............................................. H04N 1/00
[52] U.S. Cl. ........................ 358/434; 358/443; 358/468
[58] Field of Search ................................ 358/400, 403, 358/405, 407, 434, 435, 436, 438, 439, 440, 468; 380/18

[56] References Cited

U.S. PATENT DOCUMENTS

| | | | |
|---|---|---|---|
| 4,905,282 | 2/1990 | McGlynn et al. | 380/48 |
| 4,953,210 | 8/1990 | McGlynn et al. | 380/48 |
| 5,168,376 | 12/1992 | Motohama | 358/400 |
| 5,200,993 | 4/1993 | Wheeler et al. | 379/93.02 |
| 5,206,743 | 4/1993 | Hochman et al. | 358/440 |
| 5,291,302 | 3/1994 | Gordon et al. | 358/435 |
| 5,291,546 | 3/1994 | Giler et al. | 358/402 |
| 5,384,835 | 1/1995 | Wheeler et al. | 379/93.25 |
| 5,438,433 | 8/1995 | Reifman et al. | 358/468 |
| 5,452,009 | 9/1995 | Von Meister | 358/402 |
| 5,459,579 | 10/1995 | Hu et al. | 358/434 |
| 5,461,488 | 10/1995 | Witek | 358/402 |
| 5,488,651 | 1/1996 | Giler et al. | 358/407 |
| 5,490,217 | 2/1996 | Wang et al. | 380/51 |
| 5,630,079 | 5/1997 | McLaughlin | 345/146 |
| 5,696,599 | 12/1997 | Tiso | 358/437 |

OTHER PUBLICATIONS

Novell, Inc., Intelligent FAX with NEST Autoroute, Slide Presentation, Russel F. Weiser, Mar. 20, 1995.
Novell, Inc., *Novell Acquires Fax Routing Technology*, Press Release, Apr. 25, 1995.
Novell, Inc., *Nest Autoroute Marketing Brochure*, Mar. 20, 1995.
Novell, Inc., Nest Autoroute Slide Presentation, Mar. 20, 1995.
Novell, Inc., Nest Office Solutions Slide Show, Mar. 18, 1996.

*Primary Examiner*—Christopher S. Kelley
*Assistant Examiner*—Sheela Chawan
*Attorney, Agent, or Firm*—Dinsmore & Shohl LLP

[57] ABSTRACT

A method and system for controlling a messaging environment from a remote facsimile processor. The system includes a processing module and a document routing system which interact to transfer messages into and out of a messaging environment under the direction and control of a remote facsimile processor.

25 Claims, 9 Drawing Sheets

METHOD AND SYSTEM FOR DYNAMIC CONTROL OF A MESSAGING ENVIRONMENT FROM A FACSIMILE PROCESSOR

RELATED APPLICATION

This application claims the benefit of U.S. Provisional Application No. 60/013,541, filed Mar. 15, 1996, which is hereby incorporated by reference herein.

FIELD OF THE INVENTION

This invention relates to the use of facsimile devices in messaging environments, and more particularly relates to dynamically controlling from a first facsimile device the routing of a message in a messaging environment coupled to a second facsimile device.

BACKGROUND OF THE INVENTION

The phrase 'messaging environment' will be used herein to refer to computer networks and their primary function—the transfer of messages such as files, documents and other information from one apparatus or application to another. Much of the software in use in a computer network is devoted to the task of such message transfer, such as electronic mail (e-mail) services, for example. Electronic mail has proven to be one of the easiest and most popular ways to transfer information from one device to another, and from one user to another. Other products, such as group productivity software, are enjoying increasing sales because of their ability to provide even more functionality in the transfer of information among users of a network than provided by a basic e-mail system.

Where messaging environments lack is in their ability to exchange messages with devices not coupled to the network. If an individual at a network-attached device wants to transmit or receive a message from another individual at a remote location who lacks access to a network-attached device, the messaging environment is of little help. For individuals that travel frequently, this is an all too common situation. One way to transfer a message to such a remote location is through the use of a facsimile processor. These apparatus have become practically indispensable as a mechanism for transmitting documents over a long distance. Through the use of a facsimile circuit board and facsimile software, facsimile machines can be coupled to a network and be accessed by users of the messaging system. From their computer, users can transmit a message via the facsimile processor to a remote location, and the facsimile processor can receive a message from a remote facsimile processor and store the message for future retrieval by the user. While convenient, these capabilities essentially automate existing capabilities, such as printing a document and manually feeding it into a stand-alone facsimile processor.

Thus, while a facsimile server can reduce time in sending and receiving documents, they have little or only rudimentary abilities in another very important aspect of messaging environments, that of routing documents within the messaging environment itself. U.S. Pat. No. 5,206,743 to Hochman et al. discloses a method for directing an incoming facsimile message to a particular directory on a network server depending on the recipient of the message. The '743 patent discloses modifying the TSI field in the communications header of a sending facsimile message to identify the recipient of the message. The receiving facsimile processor extracts the user identifier from the TSI field, and the accompanying facsimile message is stored in a location on a network server which is designated for the user associated with the identifier. The intended user can then run a program which will display the message.

Given the inherent advantages of facsimile processors for certain types of information transfer, and particularly the ability of one facsimile processor to communicate messages to a remote facsimile processor, integration of a facsimile processor into a messaging environment could provide message routing capabilities not currently feasible. For example, it would be beneficial if a user of a sending facsimile processor could identify, at the time of message transmission, not only the recipient of the message, but the precise location in the messaging environment to which the message should be routed. For example, the user may want the message to be routed to a particular printer, or to an electronic mailbox, or to a local storage area location on a server. It would also be highly beneficial if a messaging environment could be controlled by a user operating a facsimile processor at a remote location. For example, a user may want all of their unopened e-mail messages for the day transferred from the messaging environment to the remote facsimile processor. As directed by the remote facsimile machine, the messaging environment could obtain the e-mail messages for that particular user, and communicate them via a facsimile processor coupled to the messaging environment to the remote facsimile processor.

It is apparent that a method and system which provides the ability to control the routing and transmission of messages in a messaging environment from a remote facsimile processor would be highly desirable.

SUMMARY OF THE INVENTION

It is one object of this invention to provide a method and system for controlling from a first facsimile processor a messaging environment coupled to a second facsimile processor.

It is another object of this invention to provide a method and system for dynamically routing a message in a messaging environment via a facsimile processor.

It is still another object of this invention to provide a method and system for requesting and receiving messages from a messaging environment via a facsimile processor.

It is yet another object of this invention to provide a method and system which integrates a facsimile processor into a messaging environment.

To achieve the foregoing and additional objects, a method and system is provided for controlling from a first facsimile processor a messaging environment coupled to a second facsimile processor. The method includes inserting at the first facsimile processor a user identifier associated with a user known to the messaging environment into a first subfield of a communications data field. A dynamic function code is inserted into a second subfield of the communications data field, and the communications data field is sent from the first facsimile machine to the second facsimile machine. The second facsimile machine examines the user identifier and the dynamic function code, and in conjunction with a document routing module, performs the respective task identified by the dynamic function code. If the requested task requires a security code, such as a password, the document routing module determines if a third subfield containing a security code was included in the communications data field and, if so, validates the security code before performing the specified task.

According to one embodiment of this invention, a task identified by the dynamic function code involves transferring a message accompanying the transmission of the communications data field to a particular location within the messaging environment, such as to a printer, a storage location, or a particular electronic mailbox. According to another embodiment of this invention, a task identified by the dynamic function code involves transferring a message contained in the messaging environment to the remote facsimile processor.

According to one embodiment of this invention, a facsimile processor is coupled to the messaging environment and interfaces with a document routing module located within the messaging environment. The facsimile processor and document routing module communicate with each other by exchanging packets over a network. The document routing module interfaces with various other peripherals and messaging systems which compose the messaging environment, such as printers, electronic mail services, e-mail translation services, persistent storage devices and directory services. The method and system according to this invention achieve integration of a facsimile processor into a messaging environment, such that the features of the messaging environment are available to authorized individuals at remote locations who have access to a facsimile processor.

Still other objects of the present invention will become apparent to those skilled in this art from the following description, wherein there is shown and described preferred embodiments of this invention. As will be realized, the invention is capable of other different obvious aspects, all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serve to explain the principles of the invention. In the drawings.

Reference will now be made in detail to preferred embodiments of the invention, examples of which are illustrated in the accompanying drawings, wherein like numerals indicate the same elements throughout the views.

DETAILED DESCRIPTION

Figure 1:
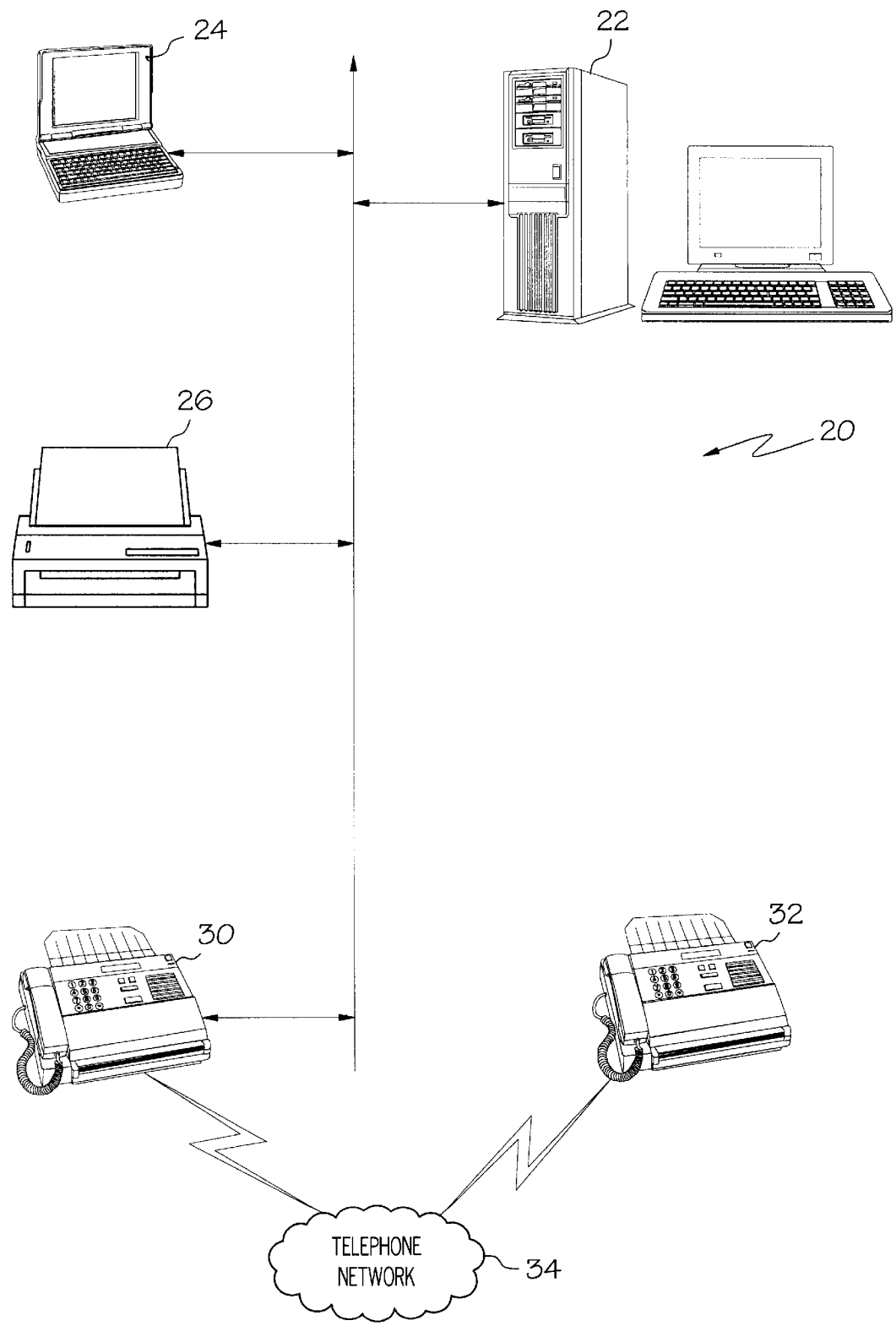
FIG. 1 is a schematic view of a messaging environment according to one embodiment of this invention.

Referring now to FIG. 1, a messaging environment 20 according to one embodiment of this invention is shown. The phrase 'messaging environment' refers to a network in which a message, such as a file, a document or the like can be transmitted over the network. Messaging environment 20 includes network-attached apparatus, such as a client computer 24, a network server 22, a printer 26, and a fax processor 30. Although fax processor 30 is shown as a separate entity from network server 22, the functionality provided by fax processor 30 could be provided as a combination of a facsimile board and software providing the functionality described herein, which could be implemented on a server, such as network server 22. The network-attached devices communicate with each other over a network 29. The network 29 can comprise any suitable communications channel, including one or a combination of conventional local area network and wide area network technologies. The network-attached apparatus contain suitable intelligence in the form of hardware and/or software, such as network adapters and network protocol stacks, for interacting with network 29.

According to one embodiment of this invention, a remote facsimile processor 32 can be utilized to call facsimile processor 30 via conventional telephone network 34. In a conventional messaging environment, a user at computer 24 can request that a file be transferred over network 29 to facsimile processor 30, and transmitted to a remote facsimile device. Also known is to enter a user identifier into a communications data field at a sending facsimile processor to identify a particular recipient of messaging environment 20. The receiving facsimile processor uses the user identifier to store the received message at a particular directory of a disk drive. This specific ability is disclosed in U.S. Pat. No. 5,206,743 to Hochman et al., entitled "Facsimile Routing Methodology", which is hereby incorporated herein by reference in its entirety. As used herein, the word message is used to refer to a unit of data which can be transferred within a networking environment, such as an e-mail message, a file, a document, a record, and the like.

In view of the variety of devices, such as persistent storage drives, printers and other facsimile machines, as well as applications, such as e-mail systems, group productivity systems, and word processors, which are involved in sending and receiving messages in a messaging environment, it would be beneficial to integrate a facsimile machine into the messaging environment such that the facsimile machine could route incoming messages to any of these locations, and transmit, upon request, messages from any of these locations. It would also be beneficial if such routing could be dynamically controlled by a user from a remote facsimile machine.

The method and system according to one embodiment of this invention uses a processing module and a document routing module, as well as a dynamic function code, to achieve comprehensive message routing and control of messages in messaging environment 20 from a remote facsimile processor, such as facsimile processor 32. An individual can enter a user identifier and a dynamic function code at facsimile processor 32. Facsimile processor 32, if necessary, formats the information, and inserts the information into a communications data field. The communication data field is transmitted to facsimile processor 30 by facsimile processor 32 during the initiation of communications. Facsimile processor 30 extracts the dynamic function code from the communications data field and in conjunction with a document routing module performs the specific task associated with the dynamic function code. For example, the dynamic function code may indicate that the accompanying fax message be routed to the electronic mailbox of the user associated with the user identifier in the data communications field. Facsimile processor 30 receives the facsimile message and forwards it to the document routing module, which, in turn, transfers the facsimile message to the appropriate electronic mailbox.

Figure 2:
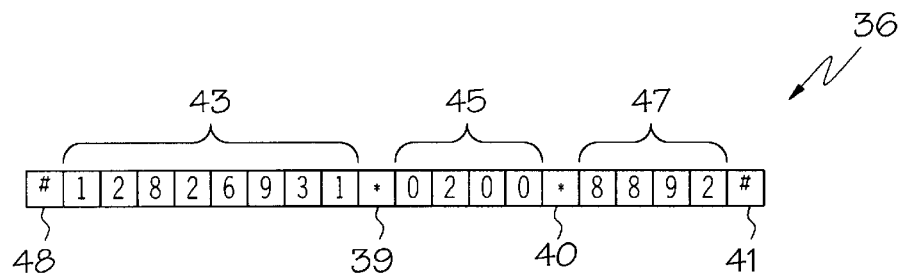
FIG. 2 shows a layout of a communications data field according to one embodiment of this invention.

FIG. 2 shows a layout of a communications data field 36 according to one embodiment of this invention. Preferably, the Transmit Station Identifier (TSI) field is used as communications data field 36. However, other fields in the handshake data fields used to establish communications between facsimile processors can be used. Communications data field 36 can comprise three subfields, such as user identifier field 43, function code field 45, and security code field 47. User identifier field 43 is used to identify a user of messaging environment 20. Function code field 45 is used to indicate the particular message processing function desired. The functionality which can be achieved by the method and system according to this invention include the transfer of messages from a remote facsimile processor to and within messaging environment 20, the transfer of messages from messaging environment 20 to a remote facsimile processor, and other functionality as described herein. The first two digits of function code field 45 indicate the desired routing function, and the last two digits of function code field 45 can be used to specify an argument associated with the function, if appropriate. Security code field 47 can be used to establish security for a particular function where appropriate. For example, before messaging environment 20 will fax to a remote location the e-mail messages associated with a particular user, security code field 47 will be checked to ensure that the password associated with that particular user has been correctly entered. Security code field 47 can also serve as a document identifier field for dynamic function codes which request the retrieval of particular numbered documents.

Beginning delimiter 48 and ending delimiter 41 can be used to identify the beginning and end, respectively, of all the relevant fields in communications data field 36. Field delimiters 39 and 40 are used to identify the start and finish of a particular subfield, such as the end of user identifier field 43, and the beginning of function code field 45. The use of field delimiters 39 and 40 allows for variable length subfields. If variable length subfields are not desired, the delimiters are not necessary, and the various subfields could have a fixed location and length. Another advantage of the use of delimiters is that a field may be omitted if not required for the particular dynamic function code, such as security code field 47, and its omission indicated by an end delimiter 41 immediately following function code field 45.

Listed below in Table 1 are examples of dynamic function codes and the tasks associated with each such function code:

| Function | Action |
|---|---|
| 00 | Route with e-mail delivery (default). An override or an additional action may be indicated in an attribute maintained in the directory services which indicates that image data over a specified size is not placed in the e-mail system but rather stored in a document storage area of the network, and an e-mail message can be generated to inform the intended recipient of the location and file name of the message. |
| 01 | Route with e-mail delivery and notification message. This function is used to route with e-mail delivery, and includes a notification to the user that a message has arrived. The notification defaults to sending a broadcast message to a user screen. Additional notification methods may be sent based on arguments, which can be suffixed to the function code. For instance, if the notification requires paging, the document routing module can access from the directory services a pager number associated with the user. |
| 02 | Route to document store. Store image data and notify specified user of image location via e-mail. The e-mail notification will indicate the location and file name of the document for later retrieval. The location of the document storage area can be determined from the directory services entry for this user. |
| 03 | Selective printing. Can requires an argument field for a number of copies. Example: an argument 05 means print 5 copies. Printer which should be used can be specified in the directory services entry for the recipient. |
| 10 | Fax back list of documents. An argument of 01 returns a list of all unopened faxes associated with the user identified in the user identifier field. An argument field of 02 returns the list of all faxes for that user received today. An argument field of 03 returns a list of all e-mail messages for that user. An argument field of 04 returns a list of all unopened e-mail messages for that user. The returned lists include document identifiers for each message listed. |
| 11 | Fax back document from document storage. This function requests that a document based on a 4-digit document identifier (documentid) in security code field 47 be faxed back to the sender of the request. |
| 12 | Fax back e-mail messages. This function requests that one or more e-mail messages be faxed to the remote facsimile processor. For retrieval of a single message, a 4-digit documentid can be entered in security code field 47. An argument field of 03 requests that all e-mail messages for that user be retrieved. An argument field of 04 requests that all unopened e-mail messages for that user be retrieved. |
| 13 | Fax back daily calendar for that user. If documentid field is absent, retrieve todays calendar. Documentid field can be used to specify a particular month and day. |
| 14 | Fax back daily tasks for that user. If documentid field is absent, retrieve todays tasks. Documentid field can be used to specify a particular month and day. |
| 20 | Enable/disable proxy services. Allows a user to indicate that proxying of messages is enabled or disabled. Argument field of 01 is enable, 00 is disable. Security code is required. Proxying relates to the ability of predetermined users of the messaging environment having access to another user's messages. This function enables or disables the predetermined users from having such access. |
| 21 | Follow me enable/disable services. Allows a user to indicate that messages should be sent to a predetermined location. Argument field of 01 is enable, 00 is disable. Security code is required. The predetermined location can be specified in the directory services entry for this user. |
| 26 | Relay broadcast. Requires the entry of a security code in security code field 47. Remote user can enter a predetermined group routing id in the user identifier field. The group routing id refers to a list of user identifiers. The group routing identifier entry in the directory services includes attributes for time or date and frequency of broadcast. An attribute in directory services for each individual user identified in the group list indicates routing information for the message, such as e-mail address, or fax number. |
| 27 | Time delayed relay broadcast by time on current day. Similar to function 26 except argument field contains the time of day to broadcast the message in a 24 hour clock. |
| 28 | Day of month delayed relay broadcast by date within current month. Similar to function 26, except argument field specifies the day of the month to broadcast, using the values 1–31. |
| 29 | Polling store/retrieve (requires a valid documentid). Provides a means of placing a document into a storage location for later retrieval based on the documentid. An argument field of 01 retrieves a document associated with a specified documentid. An argument field of 99 stores the document in a predefined "polling" storage location with a documentid that is input by a user. |
| 49 | Fax back status. Can be used to provide status or diagnostic information for fax machines. The security code field may be required. |

The above functions merely provide a limited subset of examples of types of routing tasks, and values which could be used to identify such routing tasks. It is apparent that many other routing tasks could be defined for use in the present invention.

Figure 3:
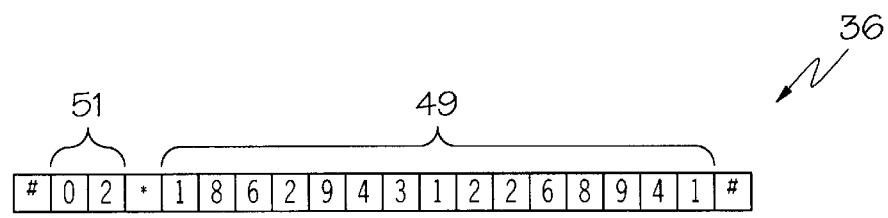
FIG. 3 shows a layout of a communications data field according to another embodiment of this invention.

FIG. 3 shows a layout of communications field 36 according to another embodiment of this invention, in which user identifier field 49 uses up to 15 bytes of the 20 available bytes of communications field 36. This variant of communications field 36 may be useful where a large number of users may be available, such as might be associated with a large telephone exchange, such as AT&T or MCI, and the set of functions available involve a simplified subset of functions which do not require entry of a security value. In this example, only two fields would be communicated in communications field 36, user identifier field 49, and function code field 51.

Figure 4:
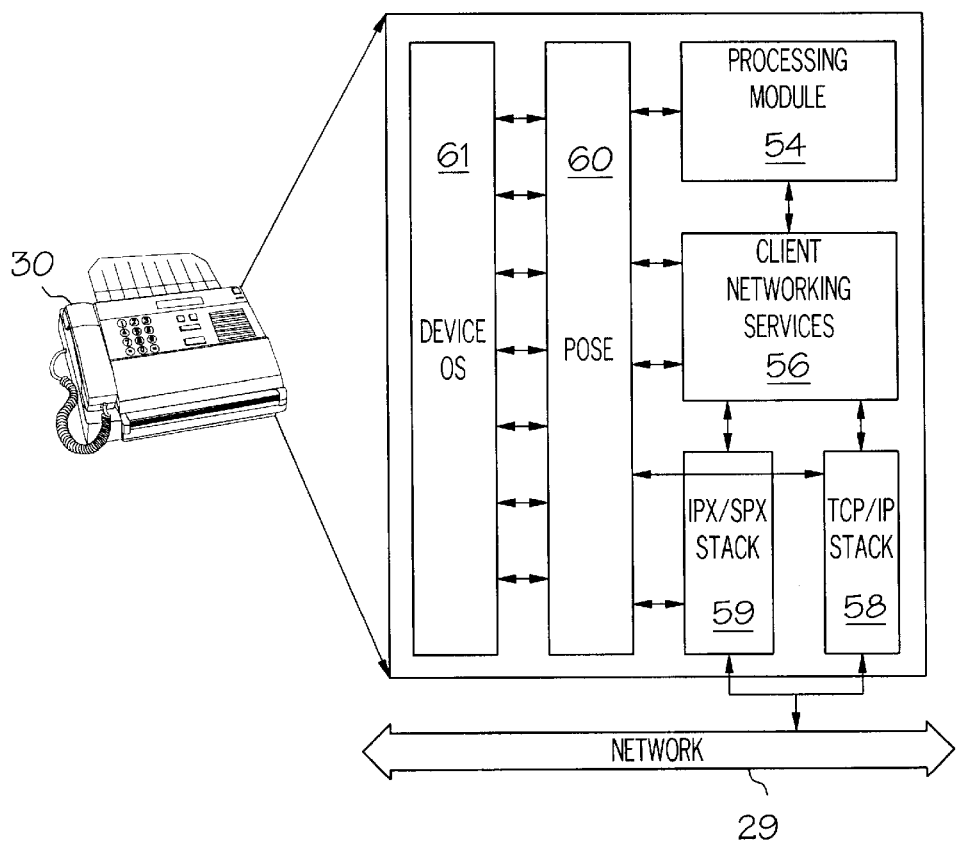
FIG. 4 is a block diagram showing various components of a facsimile processor according to one embodiment of this invention.

FIG. 4 shows a block diagram of various components used to provide facsimile processor 30 with suitable intelligence and capabilities to interact with network 29, according to one embodiment of this invention. According to another embodiment of this invention, not shown, a facsimile board is used with an appropriate software processing module, such as processing module 54, to implement the facsimile processor 30 in a network server. If implemented in a network server, many of the components of FIG. 4, such as operating system 61, client networking services 56, IPX/SPX stack 59 and TCP/IP stack 58 will already exist in one form or another in server 22, as such components are typically necessary for a conventional network server to operate.

Processing module 54 processes incoming messages from remote facsimile machines, as well as outgoing messages from within messaging environment 20 to remote facsimile machines. Processing module 54 can be written in a conventional programming language, such as C, C++, JAVA, or any other suitable programming language. Processing module 54 communicates with network 29 through client networking services 56 and a networking stack, such as TCP/IP stack 58 or IPX/SPX stack 59. Client networking services 56 can comprise a conventional client side network module operative to interact with a client application, such as processing module 56, to provide the functionality to receive and transmit packets over network 29. Facsimile processor 30 shown in FIG. 4 includes an operating system 61 which communicates with processing module 54 and network components 56, 59 and 58 via a Portable Operating System Extension (POSE) interface 60. POSE interface 60 provides an interface between device operating system 61 and modules 54, 56, 58 and 59 so that such network modules need not be modified for each disparate device operating system implemented in a facsimile processor. Such interfaces are known to those skilled in the art and will not be described herein in detail. Further, POSE interface 60 is not required, but merely useful in separating processing module 54 and the various network modules from a particular device operating system 61.

Figure 5:
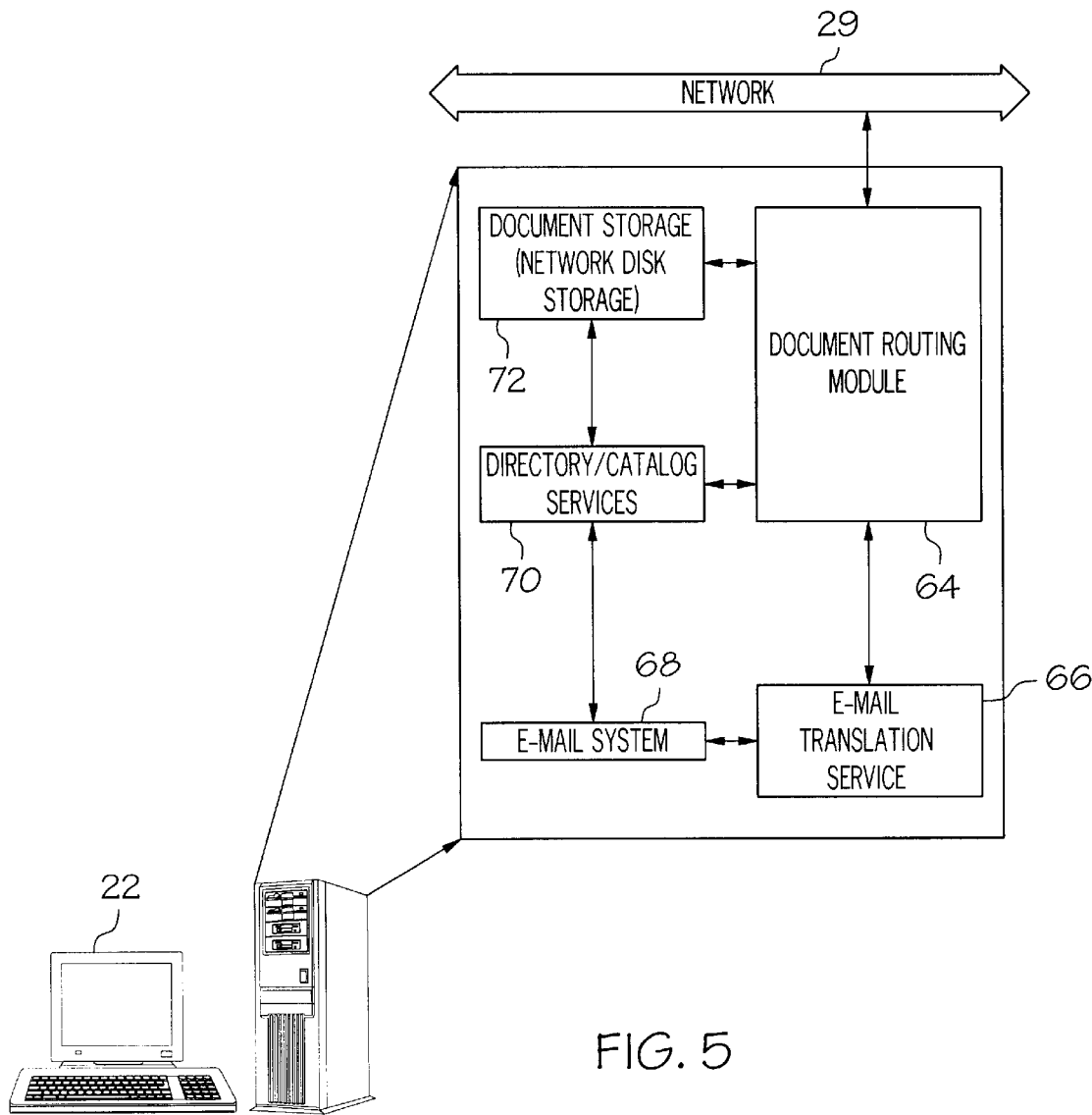
FIG. 5 is a block diagram showing various components of a network server suitable for running a document routing module according to one embodiment of this invention.

FIG. 5 shows a block diagram of various components in network server 22 according to one embodiment of this invention. Document routing module 64 provides a central routing service and interface between facsimile processor 30 and various locations in messaging environment 20, such as persistent storage 72, electronic mail (e-mail) services 68, and peripherals such as printer 26. According to one embodiment of this invention, document routing module 64 interfaces with processing module 54 in facsimile processor 30 via packets of information communicated over network 29. According to another embodiment of this invention, facsimile processor 30 can be implemented on network server 22 via a facsimile processing board, and communication between processing module 54 and document routing module 64 could take place via an application programming interface (API).

Document routing module 64 interacts with processing module 54 in facsimile processor 30 to enable control of message routing in messaging environment 20 from remote facsimile processor 32. For example, if a dynamic function code of 02 and a facsimile image is communicated to facsimile processor 30 from remote facsimile processor 32, document routing module 64 can route the facsimile image from facsimile processor 30 to persistent storage device 72. Document routing module 64 can then generate and communicate an e-mail message containing the location of the file to the user identified in the communications field via e-mail translation service 66.

If a dynamic function of 03 were entered in the function code field, document routing module 64 would communicate the received facsimile image to a network-attached printer, such as printer 26. If a dynamic function of 00 were entered in the function code field, document routing module 64 could create an e-mail message for the user identified in the user identifier field, attach the received facsimile image to the e-mail message, and forward the e-mail message via e-mail system 68 to the appropriate user.

To determine if the entered user identifier is valid, and to obtain information which may be specific to that particular user, document routing module 64 can access a system database of users, such as directory services 70. Directory services 70 maintains a record, or object, for each user of messaging environment 20. Each record contains various attributes, or information, for each user, such as a messaging environment user identifier which is used by document routing module 64 instead of the user identifier obtained from the communications data field. Other user attributes can include a security code value which can be used to validate a user-entered security code identifier in security code field 47, and a pathname of a storage location for documents associated with this user that are to be directed to local storage.

The role of directory services 70 according to this invention can be described with reference to an example in which a dynamic function code requests that all e-mail messages associated with a specified user be transferred from e-mail system 68 and faxed to remote facsimile processor 32. Upon receiving this routing request from processing module 54, document routing module 64 accesses directory services 70 to determine if a user in messaging environment 20 is associated with the user identifier contained in the communications data field of the request. If such a user exists, document routing module 64 can retrieve the attributes of the user object associated with this user, and can then verify that the security code value of the user matches the security code value entered in the communications data field. If the security code values match, document routing module 64 can request from e-mail translation service 66 all e-mail messages for the respective user. E-mail translation service 66 provides a common interface to modules such as document routing module 64 and can translate a generic message from document routing module 64 to the format required by any desired e-mail system. E-mail translation service 66 can also retrieve a message from any e-mail system, and convert the message from the respective e-mail format to a common, generic format understandable by document routing module 64. E-mail translation service 66 requests from e-mail system 68 all e-mail messages for that user. Document routing module 64 can then communicate the e-mail messages to facsimile processor 30, which can transfer via standard facsimile transmission the e-mail messages to remote facsimile processor 32.

Figure 6:
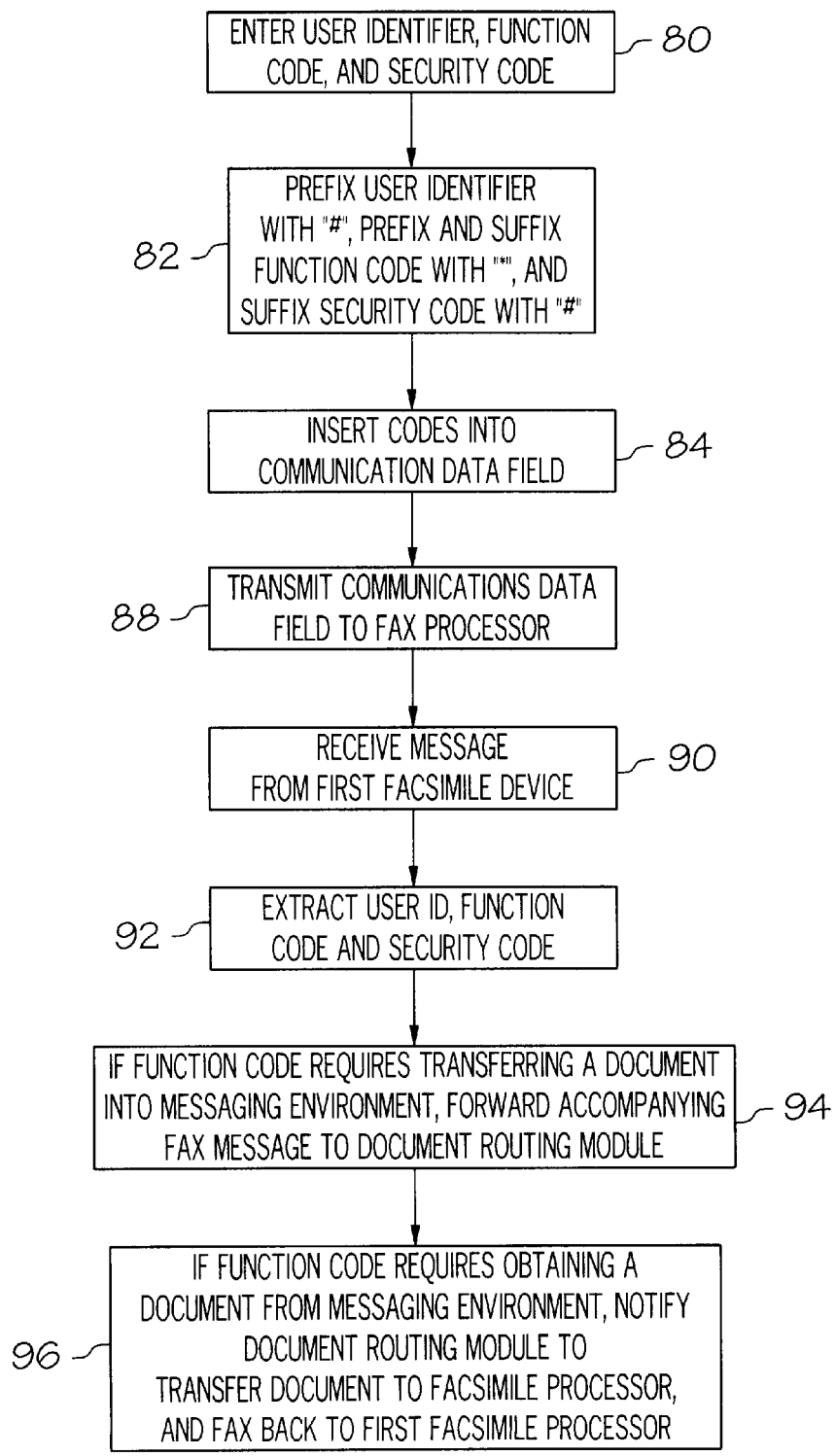
FIG. 6 is a flow diagram showing an overview of the method according to one embodiment of this invention.

FIG. 6 is a flow diagram showing a general overview of a method for controlling messaging environment 20 from a remote facsimile machine 32. Reference numerals to elements other than blocks refer to elements shown in FIGS. 1, 4 and 5. At block 80, a user identifier and function code are entered through a keypad at remote facsimile processor 32. If the function code entered requires a security code, the security code associated with the user identifier is also entered. Remote facsimile processor 32 accepts the user identifier, function code, and security code. At block 82, the user identifier is preferably prefixed, either by the user during entry, or by remote facsimile processor 32, with a begin delimiter such as a "#" character, and the function code is preferably separated from the user identifier field with a field delimiter, such as the "*" character. If no security code field is required, the function code field is prefixed with an end delimiter, such as the "#" character. If a security code field is required, the function code can be prefixed with another field delimiter, such as the "*" character, and the security code suffixed with the end delimiter, the "#" character. The use of delimiters enables the implementation of variable length data fields, but is not required. In the place of delimiters, the various data fields could be fixed length fields, as long as the receiving facsimile machine knows, by convention, the location and the length of each data field.

At block 84, remote facsimile processor 32 inserts the data into communications data field 36, such as the TSI field of a communications field used in conventional facsimile transmission. At block 88, remote facsimile processor 32 communicates the communications data field and the facsimile message to facsimile processor 30. At block 90, fax processor 30 receives the message from remote facsimile processor 32. Fax processor 30 can extract the user identifier, function code and security code and insert the data into a data structure having a predetermined layout for transmission to document routing module 64. One category of routing task achieved by this invention involves the transfer of information into messaging environment 20 from a remote facsimile processor 32, and another type of routing task achieved by this invention involves the transfer of information from messaging environment 20 to remote facsimile processor 32, depending on the dynamic function code which was entered.

Block 94 represents the former type of information transfer, wherein facsimile processor 30 receives a message from remote facsimile processor 32 and interacts with document routing module 64 to transfer the message within messaging environment 20. Block 96 represents the latter type of information transfer, wherein facsimile processor 30 communicates with document routing module 64 to obtain one or more messages from messaging environment 20, and communicates the messages to remote facsimile processor 32.

According to one embodiment of this invention, facsimile processor 30 communicates with document routing module 64 on network server 22 through the use of network packets. In a preferred embodiment of this invention, the Novell NetWare® network operating system is utilized, and the packet transmission is accomplished through the use of NetWare Core Protocol (NCP) packets. Other mechanisms for communicating between a client device, such as facsimile processor 30, and a server device, such as network server 22, are well known to those skilled in the art. Network operating systems other than the NetWare network operating system have similar mechanisms for such communication. If facsimile processor 30 is implemented as a facsimile board and special software loaded on network server 22, interaction with document routing module 64 can take place via function calls rather than network packets.

The NetWare Core Protocol allows the definition and extension of native NCP functionality through a registration process. A software module can register NCPs which are not part of the native NCP environment but which can be used by software modules for intercommunication over the network. According to one embodiment of this invention, the communication between processing module 54 and document routing module 64 are achieved by registering an NCP, and defining and using the following five subfunctions:

DRSInitiateAutoRouteTransfer

This NCP is used to verify a user identifier and to initialize file handles for the client device, such as facsimile processor 30, to utilize in transferring incoming messages to document routing module 64. Document routing module 64, upon receipt of this NCP, will recognize the format of the communications data field and verify that the format is correct. Document routing module 64 will then determine whether the user identifier in the communications data field exists. If the format is incorrect or the user identifier does not exist, a completion code of UndefinedUserIdentifier will be returned. Upon receipt of this completion code in the response NCP by facsimile processor 30, the messages will be forwarded to document routing module 64, where they will be stored in a dead letter storage area where an administrator can review the messages and determine the appropriate recipient.

To determine whether the user identifier exists, document routing module 64 preferably accesses a system wide database, such as directory services 70, which has a record, or object, for each user of the messaging environment. Directory services 70 can comprise a rudimentary table with sufficient information about each user as discussed herein, or can be implemented as a full featured network directory services, such as Novell's NetWare Directory Services. Directory services 70 can be used to translate the user identifier received in the communications data field with a network specific user identifier used in the messaging environment.

If the user identifier is valid, and the format is valid, document routing module 64 accesses the function code/argument field of the communications data field and verifies that the function code is supported. If the function code is invalid, a completion code of Undeliverable will be returned to facsimile processor 32, and the message will be stored in the dead letter storage area. If a function code was not entered, directory services 70 can be accessed to determine if a default function code has been provided for this particular user. If the function code associated with this message requires a security code, document routing module 64 will verify that the security code in the communications data field matches the security code in directory services 70 for that particular user. If the security codes do not match, the task associated with that function code will not be performed. If an invalid security code were entered, document routing module 64 can generate a network message or an electronic mail message and communicate the message to a network administrator.

Maintenance of directory services 70 can be achieved through an administration program which allows the entry, deletion, and modification of the various attributes associated with a user of the messaging environment. Such a directory services administration program can be responsible for creating user identifiers, security codes, and default function codes, and any other relevant routing information for use with document routing module 64. The code necessary to generate such a utility will vary depending on the network operating system and directory APIs of directory services 70. If directory services 70 comprises a simple, editable file, a conventional file editor can be used to add, delete and modify users of messaging environment 20.

If the user identifier and function code in the communications data field are properly verified, document routing module 64 will accumulate the number of file handles requested by facsimile processor 30. The number of file handles will correspond to the number of messages received. If possible, the files associated with the file handles will be created in the appropriate location, depending upon the dynamic function code. For example, if the dynamic function code involves transmitting a facsimile message to e-mail system 68, the files will be created in the data store of e-mail system 68. If the dynamic function code requires routing of a facsimile message to a persistent storage 72, then the files will be created in a path associated with that particular user. The path for a particular user can be specified in directory services 70. If the ultimate location of the files is another server, the files can initially be created in an inbound directory associated with facsimile processor 30, and then transferred to the appropriate server by document routing module 64 upon receipt of a DRSAutoRouteDocumentsTransfered NCP, as described in more detail below. If the requested number of file handles cannot be obtained, document routing module 64 can return an OutOfHandles completion code to facsimile processor 30. The files associated with the file handles can be created using a file extension according to the TypeOfFiles field in the NCP. If the dynamic function code specifies that the facsimile message should be printed, the files are created in the directory associated with network print facilities.

To maintain state information between document routing module 64 and facsimile processor 30, document routing module 64 creates a storage location in memory upon receipt of each DRSInitiateAutoRouteTransfer NCP, and loads the storage location with the information received in the NCP, such as the user identifier, function code and security code, as well as any information document routing module 64 will need when processing future NCPs relating to this routing task, such as the file handles associated with this NCP. Document routing module 64 generates a transferID which is a reference to the storage location created for this NCP, and the transferID is placed in the NCP response along with the obtained file handles. This transferID will be included by facsimile processor 30 in subsequent NCP packets, and will be used by document routing module 64 to determine the state of this routing request.

The layout of a DRSInitiateAutoRouteTransfer NCP according to one embodiment of this invention is set forth below:

|  | NCP sub function code | 00 |
|---|---|---|
|  | Input Parameters | Size |
|  | Transfer Type | Byte (Client = 0, Server = 1) |
|  | Number of Files | Byte |
|  | Type of Files | Word (LoHi) |
|  | Xresolution | Word (LoHi) /* DPI resolution |
| X*/ |  |  |
|  | Yresolution | Word (LoHi) /* DPI resolution |

-continued

| | | |
|---|---|---|
| Y*/ | Inbound communications data field | Byte[21] |
| | Phone/IP/Other Number | Byte[41] (Null if Client) |
| | Outbound communications data field | Byte[21] (Null if Client, Optional if Server) |
| | Output Parameters | Size |
| | Completion Code | Byte |
| | TransferID | Long (LoHi) |
| | File Handle | Long (LoHi) |
| | Nth File Handle | Long (LoHi) |
| | Completion Codes | Value |
| | Successful | 0 |
| | Undeliverable | 10 |
| | UndefinedUserIdentifier | 11 |
| | PreviousRequestNotComplete | 12 |
| | OutOfHandles | 129 |
| | Failure | FF |

| *Type of files numbers | | |
|---|---|---|
| File Type | Number | Extension |
| Unknown | 0 | |
| TIF3 | 1 | .tif |
| GIF | 2 | .gif |
| Paintbrush | 3 | .pcx |
| PostScript | 4 | .ps |
| PCL | 5 | .pcl |
| Envoy | 6 | .evy |
| text | 7 | .txt |
| Bit Map | 8 | .bmp |
| WordPerfect Doc | 9 | .wpd |
| WordPerfect Graphic | 10 | .wpg |
| Multi Page Paint Brush | 11 | .dcx |
| Fax group 3 | 12 | .fax |

Although user identifiers are generally referred to herein as being associated with a user of the messaging environment, network-attached apparatus can also be provided a user identifier, allowing the direct routing of a message from one network-attached device to another. For example, a user can enter the user identifier associated with a particular printer to direct the facsimile message directly to that printer.

DRSAutoRouteDocumentsTransfered

This NCP is sent by facsimile processor 30 after the files associated with the facsimile message have been copied to the appropriate location via the file handles returned in the DRSInitiateAutoRouteTransfer NCP. Such copying can be achieved through the use of a WriteToFileHandle NCP, or any other mechanism for communicating the message from facsimile processor 30 to the files referenced by the file handles. This NCP informs document routing module 64 to begin routing the documents to the correct location. Document routing module 64 verifies that the transferID included in this NCP is valid. If the transferID is invalid, document routing module 64 generates an InvalidTransferID completion code and stops processing the NCP. If the transferID is valid, document routing module 64 routes the documents according to the function code contained in the structure referenced by the transferID.

The files associated with the file handles will be closed by document routing module 64. Any errors occurring during the closing of the files will generate a SomeFilesInUse completion code. If this occurs, the files associated with this particular transferID will be moved to a malformed request storage area. For a function code of 00 or 01, a mail message for the appropriate e-mail system will be generated. The mail message will be directed to the e-mail address corresponding to the user identifier in the communications data field. The mechanism for generating an e-mail message is typically documented for each vendor's e-mail system and is available from the e-mail vendor. An e-mail translation service 66 can be provided as an interface between document routing module 64 and different e-mail systems. Such an e-mail translation service are known to those skilled in the art, and are frequently utilized where various e-mail systems are supported in a messaging environment.

If a function code of 02 is specified, an e-mail message will be generated with a listing of the location of the files associated with this request. The files will be stored in a location specified in directory services 70 for this particular user identifier. If a function code of 03 is specified, the files can be transferred to an appropriate network print facility. The network print facility will be responsible for converting the files into a format suitable for printing. If a function code of 29 is encountered, the files will be placed in a local data store and await retrieval by a DRSCheckForAutoRouteDocWaiting NCP looking for files in this location.

The layout of a DRSAutoRouteDocumentsTransfered NCP according to one embodiment of this invention is set forth below:

| NCP sub function code | 01 |
|---|---|
| Input Parameters | Size |
| TransferID | Long (LoHi) |
| Write Code | Byte |
| Output Parameters | Size |
| Completion Code | Byte |
| Completion Code | Value |
| Successful | 0 |
| InvalidTransferID | 13 |
| FileCopyNotCompleted | 14 |
| SomeFilesInUse | 141 |
| I/OLockError | 162 |
| Failure | FF |

DRSCheckForAutoRouteDocWaiting

This NCP is communicated by facsimile processor 30 to document routing module 64 to determine if files exist in the local data store associated with the specified user which need to be transferred to facsimile processor 30. Document routing module 64 will then determine if any documents are awaiting transfer to this user. If some documents are awaiting transfer, a transferID will be generated and communicated to facsimile processor 30. If no documents are awaiting transfer, a completion code of NoDocumentsWaiting will be returned.

The layout of a DRSCheckForAutoRouteDocWaiting NCP according to one embodiment of this invention is set forth below:

| NCP sub function code | 02 |
|---|---|
| Input Parameters | Size |
| Output Parameters | Size |
| Completion Code | Byte |
| TransferID | Long (LoHi) |
| Remaining Transfers | Long (LoHi) |
| Number of Files | Byte |

-continued

| Completion Code | Value |
|---|---|
| Successful | 0 |
| NoDocumentsWaiting | 9 |
| Failure | FF |

DRSReceiveAutoRouteDocument

This NCP is sent from facsimile processor 30 to document routing module 64 to obtain from document routing module 64 a list of file handles of documents waiting to be transferred from the local data store to facsimile processor 30. This NCP can be used after a response to a DRSCheckForAutoRouteDocWaiting NCP indicated that documents are waiting. Document routing module 64 will verify that the transferID in the NCP is a valid outstanding transferID. If it is not, document routing module 64 will generate an InvalidTransferID completion code. If the transferID is valid, document routing module 64 will return the file handles of the files waiting to be transferred. Document routing module 64 will then fill in the output parameters for the NCP response.

The layout of a DRSReceiveAutoRouteDocument NCP according to one embodiment of this invention is set forth below:

| NCP sub function code | 03 |
|---|---|
| Input Parameters | Size |
| TransferID | Long (LoHi) |
| Output Parameters | Size |
| Completion Code | Byte |
| Number of Files | Byte |
| Type of Files | Word |
| Xresolution | Word /* DPI resolution X */ |
| Yresolution | Word /* DPI resolution Y */ |
| Phone/IP/Other Number | Byte[41] |
| Outbound Autoroute Code | Byte[21] |
| First File Handle | Long (LoHi) |
| Nth File Handle | Long (LoHi) |
| Completion Code | Value |
| Successful | 0 |
| InvalidTransferID | 13 |
| Failure | FF |

DRSAutoRouteReceiveComplete

After facsimile processor 30 copies the files associated with the file handles returned in the response to the DRSReceiveAutoRouteDocument NCP, the DRSAutoRouteReceiveComplete NCP is sent from facsimile processor 30 to document routing module 64 to inform document routing module 64 that the files have been transferred. The files can be transferred to facsimile processor 30 via a ReadFileByHandle NCP, or any other mechanism for file transfer known to those skilled in the art. Document routing module 64 will then close and delete the files associated with the transferID and clean up any available memory.

The layout of a DRSAutoRouteReceiveComplete NCP according to one embodiment of this invention is set forth below:

| | |
|---|---|
| NCP sub function code | 04 |
| Input Parameters | Size |
| | |
| Request ID | Long (LoHi) |
| Read Code | Byte |
| Output Parameters | Size |
| | |
| Completion Code | Byte |
| Completion Code | Value |
| | |
| Successful | 0 |
| Failure | FF |

While the NCPs described above can be utilized to implement the method and system according to one embodiment of this invention, it is apparent that other NCPs could be defined that would provide similar functionality, and additional NCPs could be defined to provide additional functionality.

Figure 7:
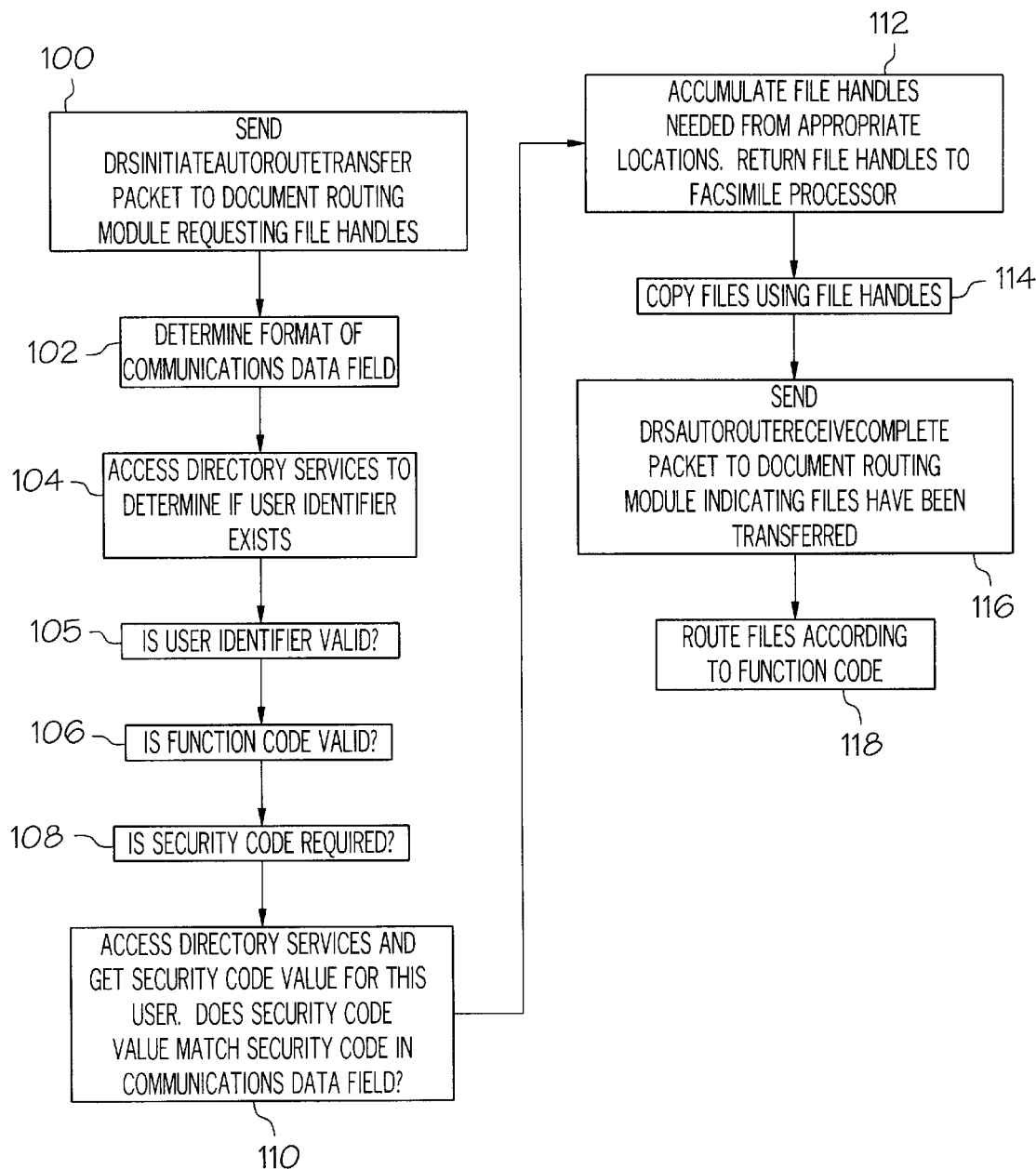
FIG. 7 is a flow diagram of a method for transferring messages as a function of a dynamic control code according to one embodiment of this invention.

FIG. 7 is a flow diagram illustrating in more detail block 94 of FIG. 6, which relates to the transfer of a message from remote facsimile processor 32 to messaging environment 20. FIG. 7 assumes steps 80–92 of FIG. 6 have already occurred. At block 100, facsimile processor 30 initiates a DRSInitiateAutoRouteTransfer NCP packet to document routing module 64. At block 102, document routing module 64 determines the format of the communications data field, and at block 104 accesses directory services 70 to determine if the user identifier exists. If at block 105 the user identifier is invalid, document routing module 64 returns an UndefinedUserIdentifier completion code and terminates the NCP. If at block 106 the function code is invalid, document routing module 64 determines if a default routing task has been specified for this user in directory services 70. If at block 108 a security code is required for this routing task, then at block 110, directory services 70 is accessed to obtain the security code value associated with the user identifier. If the security code value from directory services 70 does not match the security code value from the communications field, the NCP is terminated. At block 112, the necessary file handles are obtained in the appropriate location according to the particular dynamic function code specified. The file handles are returned to facsimile processor 30. At block 114, facsimile processor 30 begins copying the information received from remote facsimile processor 32 to the files associated with the file handles. After the file information has been transferred, facsimile processor 30 communicates a DRSAutoRouteReceiveComplete NCP to document routing module 64 indicating that the files have been transferred. At block 118, document routing module 64 routes the files to the appropriate location, such as an e-mail system, a network print facility, or a local data store, depending upon the dynamic function code.

Figure 8:
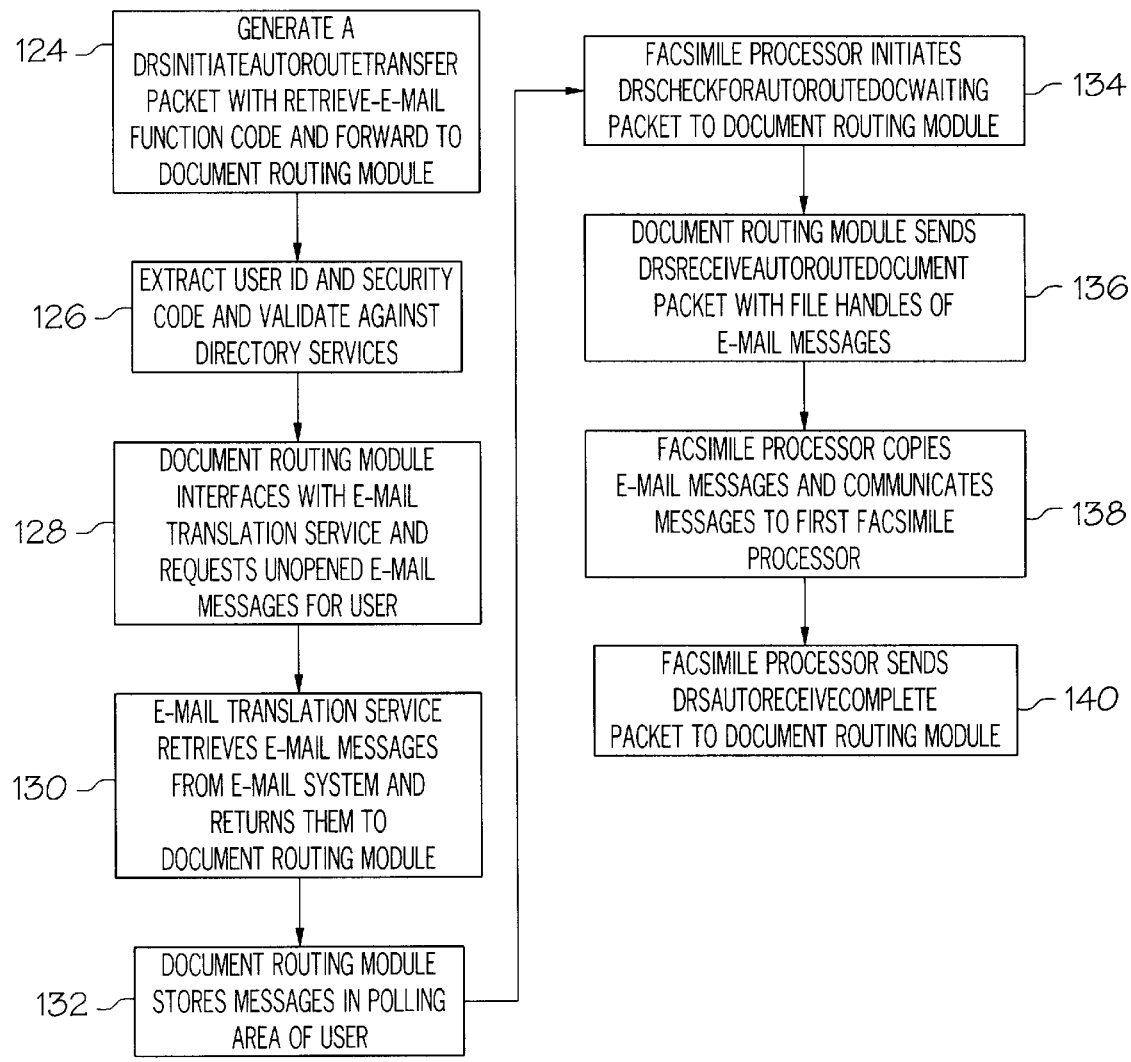
FIG. 8 is a flow diagram of a method for transferring messages in a messaging environment according to another embodiment of this invention.

FIG. 8 is a flow diagram illustrating in more detail block 96 of FIG. 6, which relates to routing a message from messaging environment 20 to remote facsimile device 32 via facsimile processor 30. FIG. 8 assumes that steps 80–92 of FIG. 6 have been completed prior to initiating block 124, and describes the processing which can occur to perform a routing task to transmit unopened e-mail messages of a specified user to remote facsimile processor 32. At block 124, facsimile processor 30 initiates a DRSInitiateAutoRouteTransfer NCP to document routing module 64. At block 126, document routing module 64 extracts the user identifier, function code and security code from the NCP and validates the security code in the NCP against the security code value for this user identifier in directory services 70. If the user identifier is invalid, document routing module 64 terminates the NCP, and can generate a log message indicating a security violation. At block 128, document routing module 64 interfaces with e-mail translation service 66 to obtain unopened e-mail messages for the specified user from e-mail system 68. At block 130, e-mail translation service 66 obtains the appropriate e-mail messages from e-mail system 68 and returns them to document routing module 64. At block 132, document routing module 64 stores the e-mail messages in the polling area specified for the user in directory services 70. At block 134, facsimile processor 30 periodically initiates a DRSCheckForAutoRouteDocWaiting NCP to document routing module 64. At block 136, document routing module 64 obtains the file handles of the files containing the e-mail messages retrieved for this user and returns the file handles in a response NCP. At block 138, facsimile processor 30 uses the file handles to copy the e-mail messages from the polling area and communicates the messages to the remote facsimile location. At block 140, facsimile processor 30 sends a DRSAutoRouteReceiveComplete NCP packet to document routing module 64. Upon receipt of this NCP, document routing module 64 can close and remove the files associated with this transfer.

Figure 9:
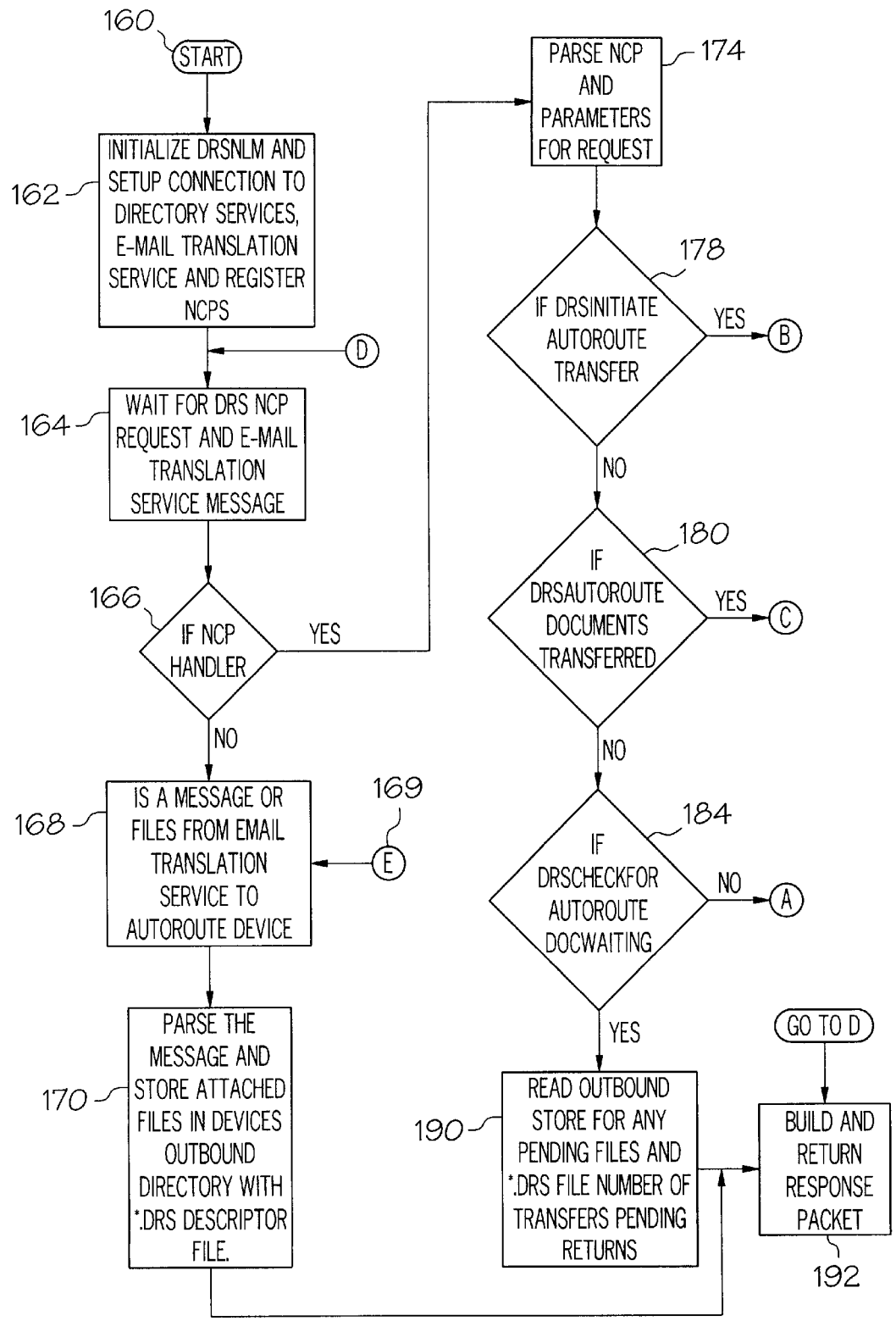
FIGS. 9–11 show a flow diagram of a document routing module according to one embodiment of this invention.
Figure 10:
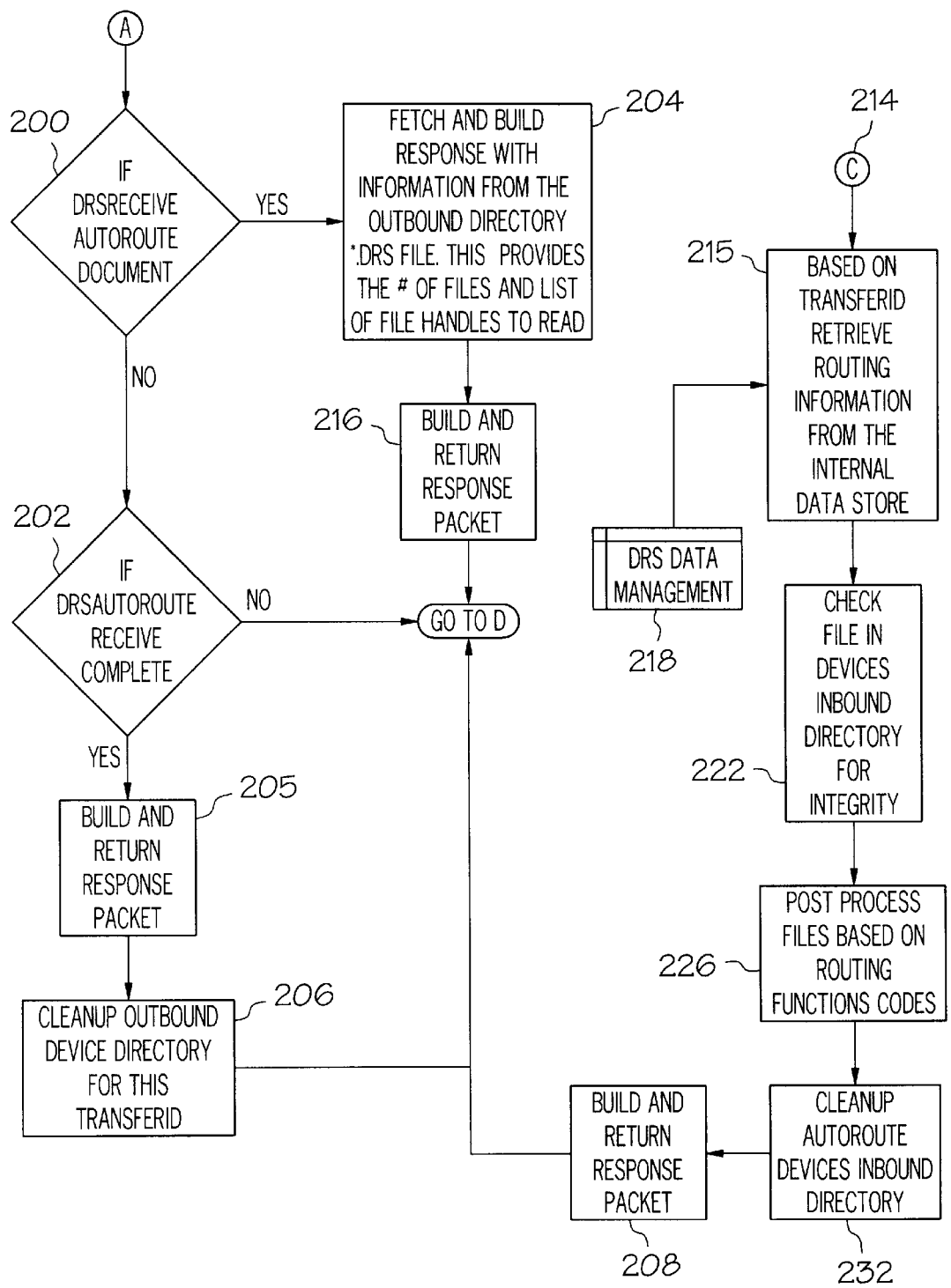
Figure 11:
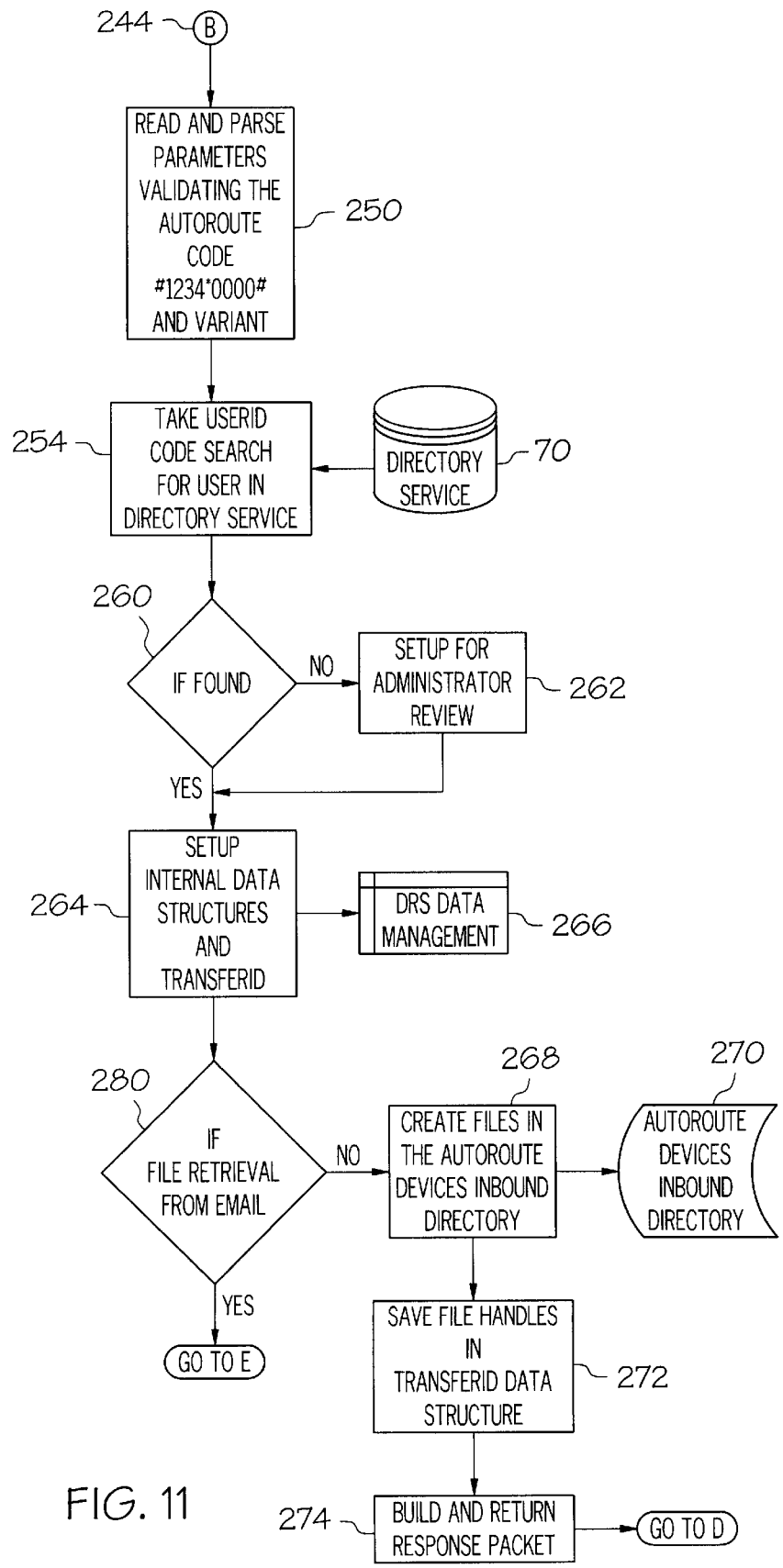

FIGS. 9–11 are flow diagrams illustrating document routing module 64 according to one embodiment of this invention. At block 160, document routing module 64 is initiated. At block 162, a connection to directory services 70 is initialized, as well as a connection to e-mail translation service 66. Document routing module 64 also registers the NCPs described above, for use in communicating with facsimile processor 30. At block 164, document routing module 64 waits for either an NCP packet or a message from e-mail translation service 66. At block 166, either a message or an NCP arrives. If an NCP arrives, then at block 174 document routing module 64 parses the NCP and the parameters associated with the NCP. If, at block 178, the NCP is a DRSInitiateAutoRouteTransfer NCP, control transfers to block 244 on FIG. 11. Referring now to FIG. 11, at block 250, document routing module 64 reads the user-entered transmission data, such as the user identifier, function code, and security code from the NCP. At block 254, document routing module 64 accesses directory services 70 and determines if the user identifier exists in messaging environment 20. If, at block 260, the user identifier is located, then at block 264 document routing module 64 initializes an internal data structure and generates a transferID referencing the data structure. The parameters in the NCP are transferred to the initialized data structure. DRS data management 266 represents the storage location, preferably in memory, of the internal data structures used by document routing module 64. If at block 260, the user identifier is not found, then at block 262, the user identifier is replaced with the user identifier associated with the system administrator, to divert the message to the administrator where the message can later be viewed to determine the correct recipient.

If, at block 280, the requested function is an e-mail retrieval request, document routing module 64 requests the e-mail messages from e-mail translation service 66, and control branches to block 169 on FIG. 9. At block 168 document routing module 64 determines that the message is from e-mail translation service 66. At block 170, the respective files associated with the e-mail message are stored in the outbound directory associated with facsimile processor 30. At block 192, document routing module 64 builds and returns a response NCP to facsimile processor 30.

Referring again to FIG. 11, if at block 280 the requested task is not an e-mail message retrieval, then at block 268 file handles are obtained, and files are created in the inbound directory associated with facsimile processor 30. Document routing module 64 preferably creates both an inbound directory and an outbound directory for each facsimile processor 30. At block 272, document routing module 64 stores the file handles in the data structure referenced by this transferID. At block 274, a response NCP is generated and returned to facsimile processor 30. At block 276, control returns to block 164 of FIG. 9 to await arrival of another message.

Referring again to FIG. 9, if at block 180, a DRSAutoRouteDocumentsTransfered NCP was received, control branches to block 214 of FIG. 10. At block 216, document routing module 64 retrieves the structure associated with the transferID in the NCP from DRS data management 218. This structure includes the state information required by document routing module 64 to maintain the current status of this routing request.

At block 222, document routing module 64 verifies that the files in the inbound directory of facsimile processor 30 have been closed. At block 226, the files are processed based on the routing task associated with the respective function code. For example, if the routing task involves copying files to the designated user's document storage area, document routing module 64 transfers the files to the appropriate directory. If an e-mail notification of the location of the files is required, document routing module 64 will communicate with e-mail translation service 66 and create and communicate a message to the appropriate electronic mailbox of the user indicating the location of the files. If, for example, the routing task involves printing the messages, document routing module 64 communicates with the network print facilities to print the files. At block 232, the files are removed from the inbound directory of facsimile processor 30. At block 208, document routing module 64 generates and returns a response NCP and communicates it to facsimile processor 30. Control returns to block 164 of FIG. 9 where document routing module 64 awaits the next message.

If, at block 184 on FIG. 9, a DRSCheckForAutoRouteDocWaiting NCP is received, then at block 190 document routing module 64 reads the outbound directory associated with facsimile processor 30 for any pending files. At block 192, document routing module 64 builds a response NCP and returns it to facsimile processor 30, with the number of files located in the outbound directory, or, if no such files exist, a NoDocumentsWaiting completion code is returned. Control then returns to the outer loop at block 164 where document routing module 64 awaits the next message. If, at block 200 of FIG. 10, a DRSReceiveAutoRouteDocument NCP is received, then at block 204, document routing module 64 obtains the file handles of the files in the outbound directory of facsimile processor 30 and returns the file handles in a response NCP at block 216. If, at block 202 a DRSAutoRouteReceiveComplete NCP is received, then at block 205 document routing module 64 returns a response NCP, and at block 206 cleans up and removes from the outbound directory of facsimile processor 30 the files associated with this transferID. Control returns to block 164 where document routing module 64 awaits another message.

The method and system according to this invention achieves complete integration of a facsimile device into a messaging environment, and achieves control of message and information transfers into and out of a messaging environment via a remote facsimile processor. The method and system according to this invention allow a user at a remote location, having access only to a facsimile processor, to communicate and receive messages in a highly flexible manner.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for controlling from a first facsimile processor a messaging environment coupled to a second facsimile processor, comprising:

inserting a user identifier into a first subfield of a communications data field, said user identifier comprising an alphanumeric code associated with a user known to the messaging environment and said communications data field comprising a location in a data structure relating to the transfer of information;

inserting a dynamic function code into a second subfield of the communications data field, said dynamic function code comprising an alphanumeric code associated with at least one of a plurality of different tasks capable of being performed in the messaging environment coupled to the second facsimile processor;

communicating the communications data field from the first facsimile processor to the second facsimile processor over a communications channel between the first and second facsimile processors;

examining the user identifier and the dynamic function code; and using the dynamic function code communicated to the second facsimile processor to control the performance of the at least one of a plurality of different tasks in the messaging environment coupled to the second facsimile processor.

2. A method according to claim 1, further comprising communicating an image from the first facsimile processor to the second facsimile processor, and wherein the dynamic function code is used to control the transfer of the image to a location within the messaging environment.

3. A method according to claim 2, further comprising generating and communicating to a device coupled to the messaging environment a notification of the existence of the image.

4. A method according to claim 2, wherein the location is one of a printer apparatus, a document storage repository and an electronic mail system.

5. A method according to claim 1, further comprising inserting a security code into a third subfield of the communications data field.

6. A method according to claim 5, further comprising the messaging environment validating the security code as a function of the user identifier.

7. A method according to claim 6, wherein the validating comprises searching a database containing user identifiers and corresponding security code values, extracting the security code value corresponding to the user identifier in the first subfield, and comparing the security code value to the security code in the third subfield.

8. A method according to claim 1, wherein the first and second subfields can have a variable length, and are separated by a delimiter character.

9. A method according to claim 1, further comprising receiving, by a document routing module, the dynamic function code from the second facsimile processor, and communicating with the second facsimile processor to perform the at least one of a plurality of different tasks in the messaging environment coupled to the second facsimile processor.

10. A system for controlling from a first facsimile processor a messaging environment coupled to a second facsimile processor, comprising:

a first facsimile processor operative to insert a user identifier into a first subfield of a communications data field, and to insert a dynamic control code into a second subfield of the communications data field, said user identifier comprising an alphanumeric code associated with a user known to the messaging environment, said communications data field comprising a location in a data structure relating to the transfer of information, and said dynamic control code comprising an alphanumeric code associated with at least one of a plurality of different tasks capable of being performed in the messaging environment coupled to the second facsimile processor;

a second facsimile processor coupled to the first facsimile processor via a communications channel;

the first facsimile processor operative to communicate the communications data field over the communications channel to the second facsimile processor; and a messaging subsystem operative to selectively perform the at least one of a plurality of different tasks in the messaging environment coupled to the second facsimile processor as a function of the dynamic control code.

11. A system according to claim 10, wherein the messaging subsystem comprises a processing module in the second facsimile processor being operative to generate a control packet as a function of the dynamic control code, and a document routing module being operative to receive the control packet and initiate the transfer of a message to a location within the messaging environment.

12. A system according to claim 11, wherein the message is communicated to the second facsimile processor by the first facsimile processor, and wherein the message is transferred to a storage location in the messaging environment as a function of the dynamic control code.

13. A system according to claim 11, wherein the message resides in a location in the messaging environment, and wherein as a function of the dynamic control code the message is transferred from the location to the second facsimile processor, and communicated by the second facsimile processor to the first facsimile processor.

14. A system according to claim 11, further comprising a directory services, the directory services being operative to contain attributes associated with the user identifier.

15. A system according to claim 14, wherein the communications data field comprises a third subfield, and wherein the first facsimile processor is operative to insert a user-entered security value into the third subfield.

16. A system according to claim 15, wherein the document routing module is operative to access the directory services as a function of the user-entered security value, and operative to retrieve from the directory services a messaging environment security value associated with the user, and wherein the document routing module is operative to determine if the user-entered security value matches the messaging environment security value.

17. A system for controlling from a first facsimile processor a messaging environment coupled to a second facsimile processor, comprising:

means for inserting into a first subfield of a communications data field a user identifier comprising an alphanumeric code associated with a user known to the messaging environment, said communications data field comprising a location in a data structure relating to the transfer of information;

means for inserting into a second subfield of a communications data field a dynamic function code, said dynamic function code comprising an alphanumeric code associated with at least one of a plurality of tasks capable of being performed in the messaging environment coupled to the second facsimile processor;

means for communicating the communications data field from the first facsimile processor to the second facsimile processor over a communications channel between the first and second facsimile processors; and means for selectively performing the at least one of a plurality of tasks in the messaging environment as a function of the dynamic function code.

18. A system according to claim 17, further comprising document routing means for communicating with the second facsimile processor, the document routing means being operative to control the transfer of a message communicated by the first facsimile processor to the second facsimile processor to a location within the messaging environment as a function of the dynamic function code.

19. A system according to claim 17, further comprising document routing means for communicating with the second facsimile processor, the document routing means being operative to control the transfer of a message from within the messaging environment to the first facsimile processor via the second facsimile processor as a function of the dynamic function code.

20. A system according to claim 17, wherein the means for selectively performing one of the plurality of tasks comprises the first facsimile processor having a processing module, a document routing module being coupled to the processing module and to the messaging environment, and the processing module and document routing module being operative to interact with one another to selectively perform the one of the plurality of tasks.

21. A system for controlling from a first facsimile processor a messaging environment coupled to a second facsimile processor, comprising:

a first facsimile processor operative to insert a user identifier associated with a user known to the messaging environment into a first subfield of a communications data field, to insert a dynamic control code into a second subfield of the communications data field, and to insert a user-entered security value into a third subfield of the communications data field;

a second facsimile processor coupled to the first facsimile processor via a communications channel;

the first facsimile processor operative to communicate the communications data field over the communications channel to the second facsimile processor;

a messaging subsystem operative to selectively perform at least one of a plurality of different tasks in the messaging environment coupled to the second facsimile processor as a function of the dynamic control code, said messaging subsystem comprising a processing module in the second facsimile processor being operative to generate a control packet as a function of the dynamic control code, and a document routing module being operative to receive the control packet and initiate the transfer of a message to a location within the messaging environment; and a directory services operative to contain attributes associated with the user identifier.

22. A system according to claim 21, wherein the document routing module is operative to access the directory services as a function of the user-entered security value, and operative to retrieve from the directory services a messaging environment security value associated with the user, and wherein the document routing module is operative to determine if the user-entered security value matches the messaging environment security value.

23. A method according to claim 1, wherein the communication data field comprises a handshake data field.

24. A method according to claim 23, wherein the handshake data field comprises a TSI data field.

25. A computer readable medium storing a set of instructions for implementing and executing the method according to claim 1.

* * * * *